UNITED STATES PATENT OFFICE.

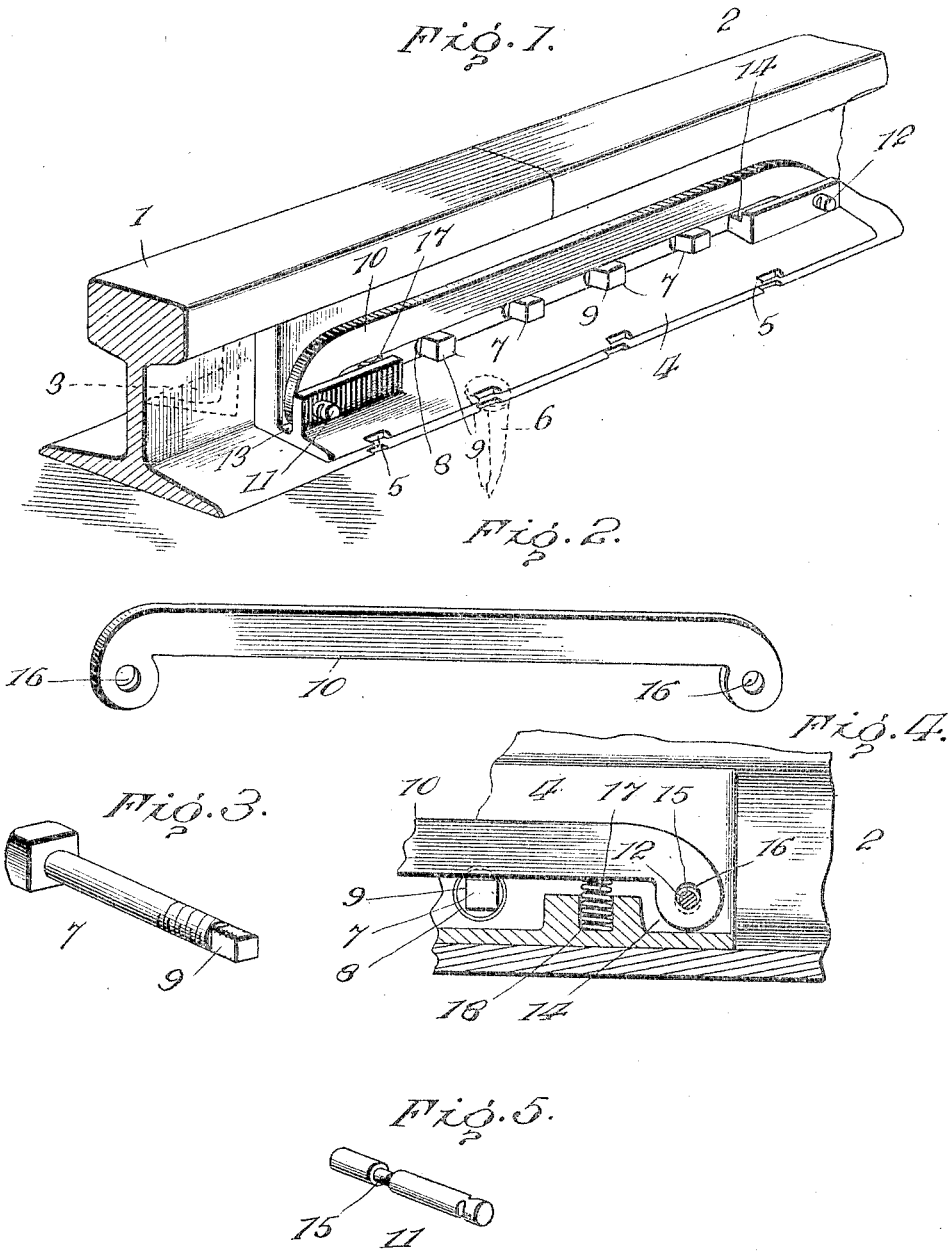

WILLIAM R. HOLLAND, OF POTOLO, FLORIDA.

RAIL-JOINT.

No. 804,471.      Specification of Letters Patent.      Patented Nov. 14, 1905.

Application filed April 14, 1905. Serial No. 255,604.

*To all whom it may concern:*

Be it known that I, WILLIAM R. HOLLAND, a citizen of the United States, residing at Potolo, in the county of Holmes and State of Florida, have invented certain new and useful Improvements in Rail-Joints, of which the following is a specification.

This invention relates to a combined rail-joint and bolt-lock, and has for its object to produce a device of that character which will entirely eliminate the use of nuts and which will effectively lock the bolts against turning loose.

Reference is to be had to the accompanying drawings, in which—

Figure 1 is a perspective view of a rail-joint embodying my invention. Fig. 2 is a side view of the locking-bar. Fig. 3 is an enlarged perspective view showing in detail the type of bolt used. Fig. 4 is a longitudinal sectional view through one of the recesses in the fish-plate. Fig. 5 is a perspective view of the locking-pin.

Corresponding and like parts are referred to in the following description and indicated in all the views of the drawings by the same reference characters.

The numerals 1 and 2 indicate the adjacent ends of two rails which are of the usual construction. Fish-plates 3 and 4 are employed on either side of the joint and are so shaped that they extend from the under side of the head of the rail down over and slightly beyond the flanges at the base of said rail and are provided with notches 5 for the engagement of the spikes 6 used in fastening the rail to the ties. Corresponding openings are provided in the rails and fish-plates through which bolts 7 are passed in joining the two together. The openings 8 in one of the fish-plates 3 are threaded so that the bolts 7 can be screwed into said threaded openings and the use of nuts eliminated. The ends 9 of the bolts 7 are made square or rectangular in cross-section, as best seen in Fig. 3 of the drawings. A locking-bar 10 is provided, which fits over the rectangular ends 9 of the bolts 7 and has its ends bent down and fastened by pins 11 and 12 in recesses 13 and 14, formed at either end of the fish-plate 3 by lugs projecting upwardly and spaced from the vertical portion of said fish-plate embracing the web of the rail. The pins 11 and 12 are encircled by grooves 15, which are adapted to engage with the openings 16 in the locking-bar 10 and prevent said pins from working out of place. This engagement is made positive by the use of springs 17, embedded in recesses 18 at either end of the fish-plate 3 and so placed as to have an upward pressure upon the ends of the locking-bar 10. The square ends of the bolts have the additional advantage that should the bolts become broken they can be very readily removed.

The operation of the device is as follows: The fish-plates 3 and 4 are placed in position and the bolts 7 screwed in, as usual. The locking-bar 10 is then placed over the rectangular ends 9 of the bolts 7, so as to prevent their working loose, and the ends of said locking-bar forced into the recesses 13 and 14 against the pressure of said springs 17, and the pins 11 and 12 placed in position, so that when the locking-bar is released the springs will force it upward, so that the openings 16 in its ends will engage with the grooves 15 in the pins to prevent their working out of position. In order to unlock the bolts, it is simply necessary to push the locking-bar slightly downward in order to remove the pins which hold it in position.

It will be obvious that, if desired, one end of the locking-rod 10 could be permanently pivoted and the other end fastened, as heretofore described. This would have the advantage that it would be permanently secured to the fish-plate, and therefore not liable to get lost.

From the foregoing description it will be readily understood that I have invented a rail-joint which is very simple in construction and which will positively lock the bolts against working loose, and thus serve to cut down the expenses of keeping a track in running condition.

Having thus described my invention, what I claim as new is—

1. In a rail-joint, the combination of the adjacent rail ends, fish-plates, bolts having a flattened side at their end and passing through registering openings in the fish-plates and rails, the openings in one of the fish-plates having threads to engage with the threads of said bolts, and a locking-bar adapted to engage with the flattened sides at the ends of the bolts to prevent their working loose, and means for holding the locking-bar in position.

2. In a rail-joint the combination of the adjacent rail ends, fish-plates embracing the web and flanges of said rails, bolts having a flattened side portion and passing through registering openings in the fish-plates and rails, the openings in one of the fish-plates having threads to engage with the threads of said bolts, and a locking-bar adapted to pass over the rectangular ends of the bolts to prevent their working loose, the ends of said locking-bar being turned down and fastened between the vertical portion of the fish-plate and upwardly-projecting lugs by pins passing through registering openings.

3. In a rail-joint the combination of the adjacent rail ends, fish-plates embracing the web and flanges of said rails, bolts having a flattened side portion and passing through registering openings in the fish-plates and rails, the openings in one of the fish-plates having threads to engage with the threads of said bolts, a locking-bar adapted to engage with the flattened sides of the bolts to prevent their working loose, the ends of said locking-bar being provided with openings and turned down between the vertical portion of the fish-plates and upwardly-projecting lugs provided with corresponding openings, pins provided with an encircling groove and adapted to fasten the locking-bar in position, and springs pressing upon said locking-bar to cause the openings in the end thereof to engage with the beforementioned groove in the pins.

4. In a rail-joint, the combination of bars or plates embracing opposite sides of the abutting ends of adjacent rails, bolts connecting the rail ends and bars and having flattened portions, a locking-bar in engagement with the flattened parts of the bolts to prevent their turning and having an opening, a securing-pin passed through the opening of the locking-bar and having a seat in its side, and a spring normally exerting a pressure on the locking-bar to hold it in the seat of the securing-pin to prevent displacement of the latter.

In testimony whereof I affix my signature in presence of two witnesses.

WILLIAM R. HOLLAND. [L. S.]

Witnesses:
J. S. McNEILL,
F. M. MAYBIN.